April 29, 1924.  
F. J. KASTER ET AL  
1,492,132  
FRUIT BLANCHER  
Filed March 16, 1922  2 Sheets-Sheet 1
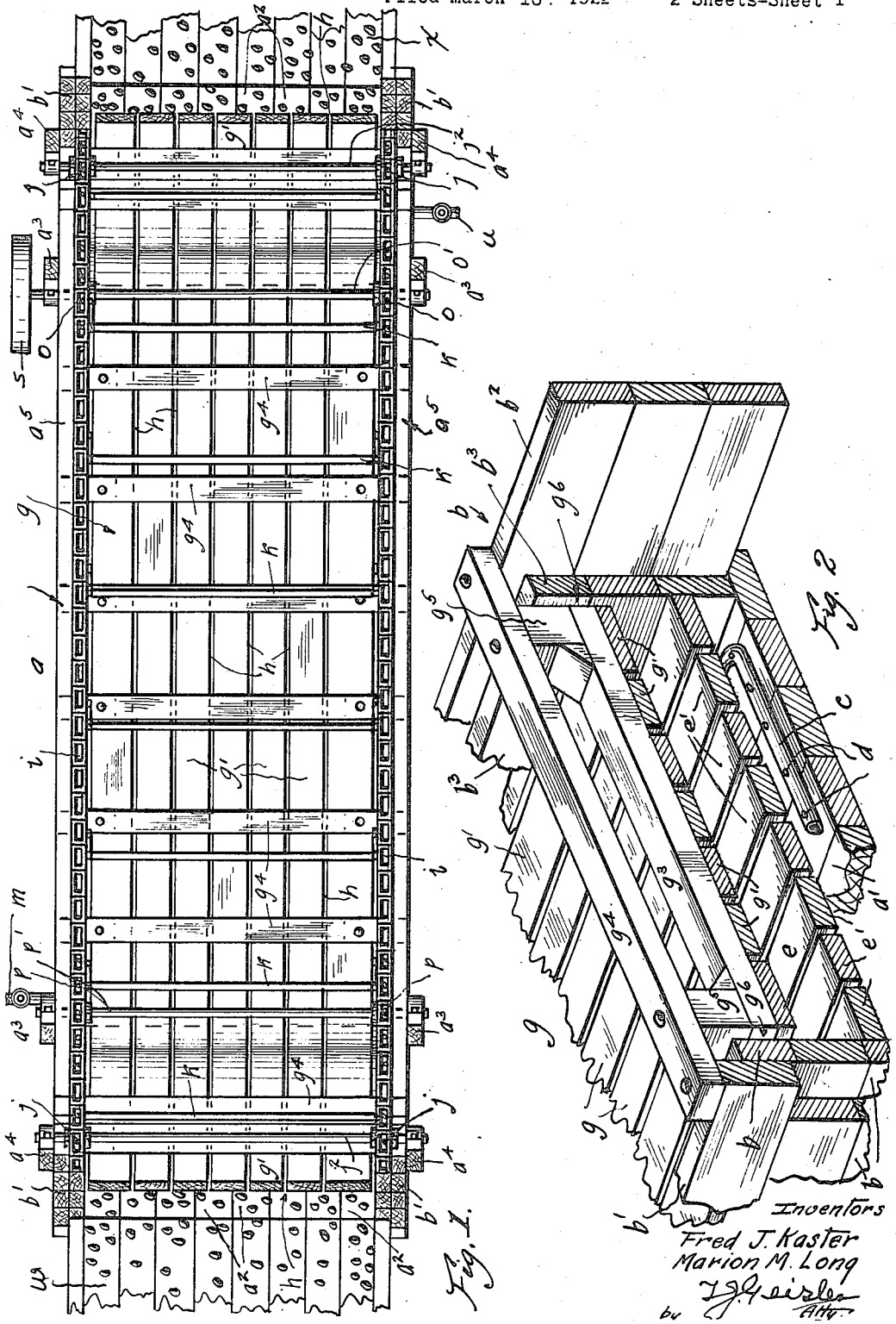
Inventors  
Fred J. Kaster  
Marion M. Long  
by

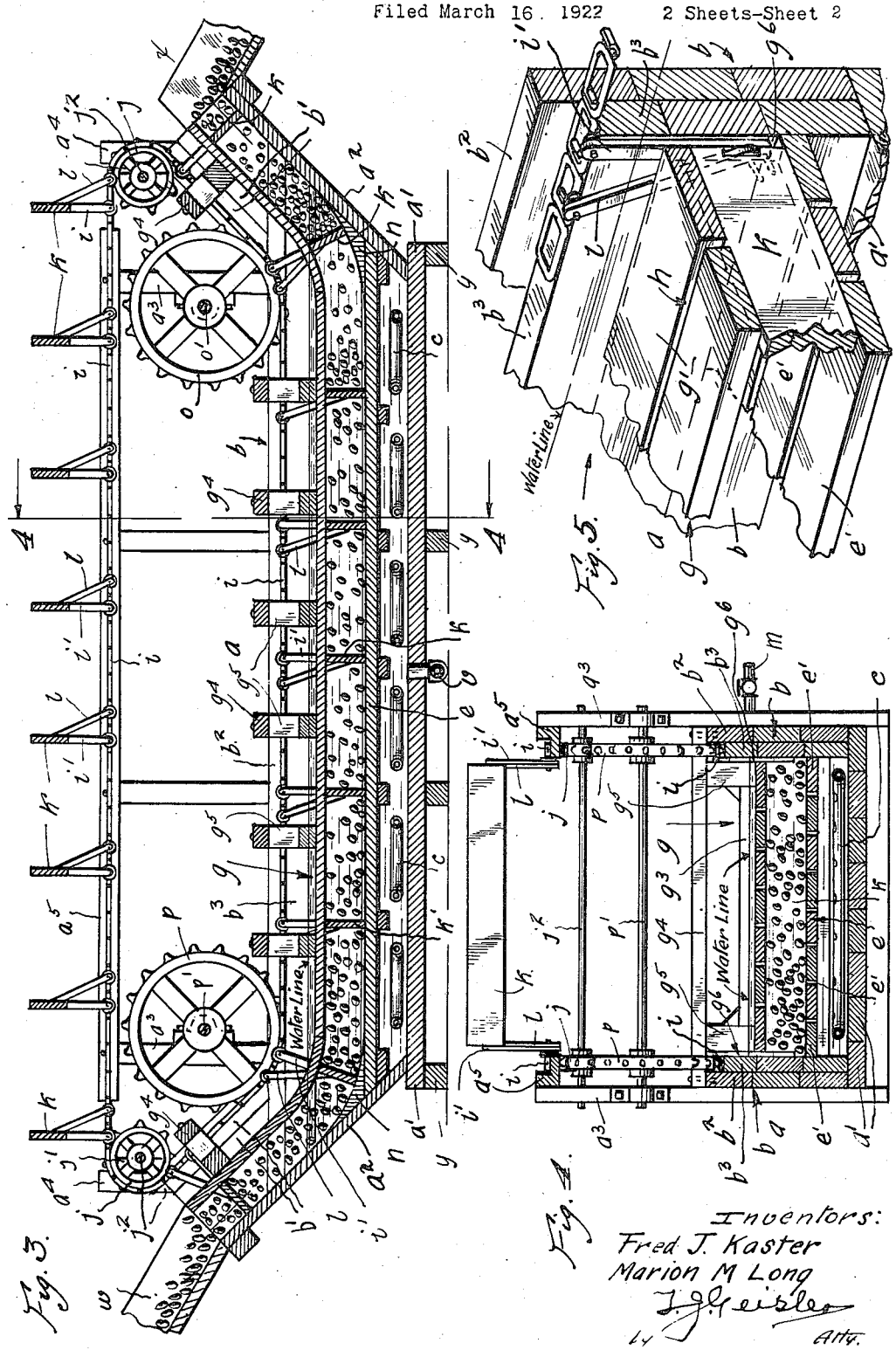

Patented Apr. 29, 1924.

1,492,132

UNITED STATES PATENT OFFICE.

FRED J. KASTER AND MARION M. LONG, OF PORTLAND, OREGON.

FRUIT BLANCHER.

Application filed March 16, 1922. Serial No. 544,188.

*To all whom it may concern:*

Be it known that we, FRED J. KASTER and MARION M. LONG, citizens of the United States, and residents of Portland, county of Multnomah, and State of Oregon, have invented a certain new and useful Improvement in Fruit Blanchers, of which the following is a specification.

Our invention relates to blanching of fruit and vegetables.

As is well known, the cut surfaces of fruit, especially apples, soon acquires a brown surface which is due to the fermentive action of an enzyme. In order to prevent such fermentation it is customary to immerse the fruit in a chemical solution containing a soluble salt such as ordinary salt, sulphite of soda or alum.

It has been observed also that fruit containing a high acid content seemingly reacts chemically with corrodible metal. This reaction is also prevented by placing the fruit in any of the said chemical solutions immediately after the fruit has been cut or touched by metal.

In order to be palatable it is necessary that the fruit be thoroughly cleansed of the chemical of the said solution before the fruit may be canned. Such cleansing is done at the same time as the blanching operation with our invention. Heretofore it has been customary to cleanse the fruit of said soluble salts by exposing the same to steam. Such treatment also, however, had the effect of removing the starches and sugar, and thus the individual taste of the fruit was impaired.

We have discovered that a better way of cleansing the fruit of said salt solution is to immerse the fruit in a trough of water which is heated to a predetermined desirable temperature.

Therefore, one of our main objects is to provide a simple and efficient method and means whereby the chemical of said solution may be removed from the surface of the fruit, without removing the sugars and starches of the latter.

It follows therefore, that if the chemical protection has been removed the fruit is left exposed again to the attack of corrosive metals and fermentation. It has been found that relatively large proportions of fruit discolor in the cans after a considerable time. From our experiments we believe that this discoloration is due to the action of the corrodible metals with which the fruit and water bath come in contact in the blancher.

A further object of our invention is to provide a blanching machine in which no corrodible metallic surfaces are in contact with the water in which the fruit is contained.

A further object is to provide a simple and efficient means for effectively blanching any fruit or vegetables.

These and other objects are attained in the device the construction and operation of which is shown in the accompanying drawings:

Fig. 1 is a plan view of our blancher, and shows the out board pulley by which the paddles are moved;

Fig. 2 is a perspective detail showing how the cover may be removably secured over the conveyor paddles;

Fig. 3 is a longitudinal section and shows that the conveyor paddles are always normal to the bottom of the blancher, thereby they are preventing the crushing of any fruit between them and the blancher;

Fig. 4 is a cross sectional view taken on the line 4—4 of Fig. 3 and shows how the apples are held under water during their entire passage thru the blancher; and Fig. 5 is a perspective detail view which shows how the drive chains ride along guiding ledges and thus are prevented from coming in contact with the water bath.

$a$ is a trough like container consisting of the bottom $a'$ and the bevel walls $b$. The inclined ends $a^2$ form a continuation of the bottom $a'$ and the extensions $b'$ form the extended sides for these inclined ends. $e$ is a false bottom made of separate boards $e'$ which are spaced apart so as to leave openings $f$. The removable cover $g$ is made up of separate boards $g'$ which are spaced apart so as to leave openings $h$ between them. The separate boards $g'$ of the cover $g$ are held by cross members $g^3$. Overhanging members $g^4$ are attached to the cross members $g^3$ by small blocks $g^5$. These overhanging members $g^4$ rest upon the upper edges $b^2$ of the outermost portions of the side wall $b$. The top edges $b^3$ of the inner side walls serve as guides upon which the chains $i$ ride. These chains $i$ are moved by meshing with the drive sprockets $o$ which are mounted on shaft $o'$ and driven by pulley $s$. They also mesh under idling sprockets $p$ mounted on shaft $p'$ and runs over other idling sprockets $j$. The shafts $o'$ and $p'$ are mounted to vertical struts $a^3$. The sprockets $j$ are mounted on shafts $j^2$ which are in turn mounted on the vertical struts $a^4$. Horizontal L-shaped sections $a^5$ mounted to the vertical struts $a^3$ and $a^4$, serve as guides on which the chains $i$ ride when traveling overhead thus serving to keep the chains from sagging and in mesh with the sprockets. Paddles $k$ are joined to the chains $i$ by means of non-corrosive bars $i'$ which are connected to predetermined links in the chain. Braces $l$ serve as auxiliary supports to hold paddles $k$ normal to chain $i$. The braces $l$ move thru the cover $g$ in the opening $g^6$.

The water line is constant because any increase in inflow thru the perforations $d$ in the non-corrosive intake pipe $u$ is taken care of thru the overflow pipe $m$.

It can be seen that the water will never touch the iron chains $i$ or the sprockets $o$ and $p$ but that it will merely be in contact with the wood construction and the non-corrosive bars and supports. Fillets $n$ are placed in the corners where the false bottom $e$ is attached to the extensions $a^2$ of the casing. These fillets are of the desired curvature so that paddles in their movement will always be only slightly above the false bottom, and therefore small particles of fruit can not be mashed underneath the paddles. Steam is introduced thru the inlet $u$ into the pipes $c$ and is exhausted thru the perforations $d$ in the said pipes. The continuation of the steam allows a change of water and the surplus water overflows thru the outlet $m$ which is positioned on the permanent water line or thru the drain $o$.

$w$ is a chute for feeding the fruit to the blancher and $x$ is a chute at the expelling end leading to a convenient hopper from which the fruit is speedily taken and canned. The blancher is raised slightly from the floor by means of the blocks $y$.

It can be noted that the entire construction which is in contact with the blanching water is made of wood and non-corrosive metal.

We have discovered all discolorations can be eliminated, by the use of water instead of steam which is common in blanchers at the present time. We are able to remove the soluble salt solution from the fruit without materially eliminating the sugars and starches from the fruit. In this way I am able to pack the fruit so that it will always have its true fruit flavor and color providing that all other things are satisfactory.

As can be noted from the accompanying drawings, and the description, the paddles always pass thru the blancher normal to the false bottom and cover and thus no fruit can be crushed. These paddles also serve as positive conveyors as the openings between the separate boards of the false bottom and cover are large enough for the steam and water to pass thru and circulate freely around the fruit and are still not large enough so that the fruit can pass out from between the said cover and false bottom.

We claim:

1. A fruit blancher comprising, a trough, a pair of endless sprocket-chains, carriers for said sprocket-chains located at the ends of said trough, a series of paddles, members securing said paddles to said sprocket-chains, a housing in the lower part of said trough, forming an open-ended chamber extending longitudinally of the trough, the sides of said housing being adapted to provide working spaces for said members carrying the paddles, the latter travelling in said chamber, but said sprocket-chains being located above said chamber, the open ends of said chamber rising above the predetermined normal water line of said trough.

2. A fruit blancher comprising, a trough, provided with a perforated false bottom, means for heating the water in the trough, such means located under the false bottom of said trough, a pair of endless sprocket-chains, carriers for said sprocket-chains located at the ends of said trough, a series of paddles, and members securing said paddles to said sprocket-chains, means for guiding the lower portions of said sprocket-chains in parallelism with the bottom of said trough, thereby maintaining said paddles normal to said bottom, ledges on the sides of the trough supporting the lower portions of said sprocket chains, thereby holding said paddles from frictional contact with the bottom of the trough, a removable housing in the lower part of said trough, forming an open ended chamber extending longitudinally of the trough, the sides of said housing being adapted to provide working spaces for said members carrying the paddles, the latter traveling in said chamber, but said sprocket chains being located above said chamber, the open ends of said chamber rising above the predetermined normal water line of said trough.

3. A fruit blancher comprising, a trough, provided with a perforated false bottom, means for heating the water in the trough, such means located under the false bottom of said trough, a pair of endless sprocket-chains, carriers for said sprocket-chains located at the ends of said trough, a series of paddles, and members securing said paddles to said sprocket-chains, ledges on the sides of the trough supporting the lower portions of said sprocket-chains, thereby holding said paddles from frictional contact with the bottom of the trough.

4. A fruit blancher comprising, a trough, provided with a perforated false bottom, a pair of endless sprocket-chains, carriers for said sprocket-chains located at the ends of said trough, a series of paddles, members securing said paddles to said sprocket-chains, a housing in the lower part of said trough, forming an open-ended chamber extending longitudinally of the trough, the sides of said housing being adapted to provide working spaces for said members carrying the paddles, the latter traveling in said chamber, but said sprocket chains being located above said chamber.

5. The combination set forth in claim 4 distinguished in that said housing is removable.

6. A fruit blancher comprising, a trough, provided with a perforated false bottom, means for heating the water in the trough, means preventing the fruit coming in contact with said heating means, a pair of endless sprocket-chains, carriers for said sprocket-chains, located at the ends of said trough, a series of paddles, members securing said paddles to said sprocket-chains, a removable housing in the lower part of said trough, forming an open-ended chamber extending longitudinally of the trough, the sides of said housing being adapted to provide working spaces for said members carrying the paddles, the latter traveling in said chamber, but said sprocket-chains being located above said chamber.

7. A fruit blancher comprising, a trough, a pair of endless sprocket-chains, carriers for said sprocket-chains located at the ends of said trough, a series of paddles, non-corrosive members securing said paddles to said sprocket-chains, a housing in the lower part of said trough, forming an open-ended chamber extending longitudinally of the trough, the sides of said housing being adapted to provide working spaces for said members carrying the paddles, the latter traveling in said chamber, but said sprocket-chains being located above said chamber.

MARION M. LONG.
FRED J. KASTER.